(12) United States Patent
Sekiya (10) Patent No.: US 7,916,365 B2
(45) Date of Patent: Mar. 29, 2011

(54) IMAGE READING APPARATUS AND IMAGE FORMING APPARATUS WITH WHITE LIGHT EMITTING COLOR CORRECTION ELEMENTS

(75) Inventor: Takeshi Sekiya, Abiko (JP)

(73) Assignee: Canon Kabushiki Kaisha, Japan (JP)

( * ) Notice: Subject to any disclaimer, the term of this patent is extended or adjusted under 35 U.S.C. 154(b) by 232 days.

(21) Appl. No.: 11/832,696

(22) Filed: Aug. 2, 2007

(65) Prior Publication Data

US 2008/0030813 A1    Feb. 7, 2008

(30) Foreign Application Priority Data

Aug. 2, 2006    (JP) .................. 2006-211191

(51) Int. Cl.
*H04N 1/46* (2006.01)

(52) U.S. Cl. ......... 358/516; 358/1.1; 358/445; 358/512; 358/518

(58) Field of Classification Search .............. 250/208.1; 358/509, 512–518

See application file for complete search history.

(56) References Cited

U.S. PATENT DOCUMENTS

| | | | |
|---|---|---|---|
| 5,767,976 A | | 6/1998 | Ankerhold et al. |
| 5,969,343 A | * | 10/1999 | Nakamura et al. ........ 250/227.31 |
| 7,119,500 B2 | * | 10/2006 | Young ............................ 315/294 |
| 2004/0238722 A1 | * | 12/2004 | Hiromatsu .................. 250/208.1 |
| 2006/0268544 A1 | * | 11/2006 | Rains Jr. et al. ............... 362/231 |
| 2008/0088244 A1 | * | 4/2008 | Morishita ...................... 315/154 |
| 2008/0224024 A1 | * | 9/2008 | Ashdown ...................... 250/205 |
| 2008/0265799 A1 | * | 10/2008 | Sibert ........................... 315/292 |

* cited by examiner

*Primary Examiner* — Benny Q Tieu
*Assistant Examiner* — Marcellus Augustin
(74) *Attorney, Agent, or Firm* — Rossi, Kimms & McDowell LLP

(57) ABSTRACT

An image reading apparatus equipped with an illuminating device having little tint variation. A lamp unit illuminates an original with light, and includes a plurality of white LEDs, and a plurality of auxiliary LEDs that emit lights of different colors and arranged in a manner associated with the white LEDs. A CPU causes auxiliary LEDs to be lighted, so as to correct a color of light emitted from each of the white LEDs. An image reading unit reads the original illuminated by the lamp as an image.

10 Claims, 9 Drawing Sheets

IMAGE READING APPARATUS AND IMAGE FORMING APPARATUS WITH WHITE LIGHT EMITTING COLOR CORRECTION ELEMENTS

BACKGROUND OF THE INVENTION

1. Field of the Invention

The present invention relates to an image reading apparatus equipped with an illuminating device, and an image forming apparatus.

2. Description of the Related Art

Conventionally, an image reading apparatus (original reading apparatus) is provided with an illuminating device for illuminating an original on a read line-by-read line basis. Many of illuminating devices of this type have conventionally been using a halogen lamp, a xenon lamp, or a like light source. Recently, as a more efficient light source than the conventional ones, there has been proposed a light source which uses an LED array comprised of a plurality of LEDs (Light Emitting Diodes) in a linear arrangement (e.g. in U.S. Pat. No. 5,767,976).

However, the prior art suffers from the following problem:

When a white LED array formed by arranging a plurality of white LEDs is used as an illuminating device for a color scanner, the arranged individual white LEDs sometimes have different tints (chromaticities) from each other due to their structures, thereby causing a tint variation in the LED array.

A white LED produces its white light by coating of a yellow phosphor (or red and green phosphors) on a blue light emitting element. Therefore, the tint thereof can be largely changed by the balance between the light intensity of the LED and the amount of coating of the phosphor. Therefore, white LEDs are not optimum for an illuminating device for a color scanner.

To solve the above problem, it is possible to realize an LED array with little tint variation if white LEDs having the same tint are selectively used. However, the selecting operation thereof largely increases the cost of the LED array, which makes the illuminating device expensive.

Further, even if a light source has a color variation, by correcting image data obtained by reading an image, it is possible to eliminate influence of the color variation on output image data. However, although a reference color (mainly white) used in the correction can be corrected to an accurate chromaticity, intermediate colors can have different tints (chromaticities) from the actual ones of an original.

SUMMARY OF THE INVENTION

The present invention provides an image reading apparatus equipped with an illuminating device having little tint variation, and an image forming apparatus.

In a first aspect of the present invention, there is provided an image reading apparatus comprising an illuminator adapted to illuminate an original, the illuminator including a plurality of white light-emitting elements, and a plurality of colored light-emitting elements adapted to emit lights of different colors and arranged in a manner associated with each of the respective white light-emitting elements, a controller adapted to cause the colored light-emitting elements to emit lights, so as to correct a color of light emitted from each of the white light-emitting elements, and a reader adapted to read the original illuminated by the illuminator as an image.

With the arrangement of the first aspect of the present invention, even when a plurality of white light-emitting elements are employed in the image reading apparatus, it is possible to read an original by illuminating the original with white light having little tint variation.

The controller can be adapted to cause the colored light-emitting elements to emit lights having respective color components which the color of light emitted from each of the white light-emitting elements lacks.

In a second aspect of the present invention, there is provided an image reading apparatus comprising an illuminator adapted to illuminate an original, a reader adapted to read the original illuminated by the illuminator as an image, light emitting elements adapted to emit colored lights for use in color correction of illumination by the illuminator, and a controller adapted to cause the reader to read a white reference member illuminated by the illuminator and control light emission of the light emitting elements according to results of reading the white reference member illuminated by the illuminator.

In a third aspect of the present invention, there is provided an original illuminating apparatus comprising an illuminator adapted to illuminate an original, a detector adapted to detect a color of illumination by the illuminator at a plurality of positions, a plurality of light emitting elements adapted to emit colored lights for color correction of illumination of the illuminator, and a controller adapted to cause at least one of the plurality of light emitting elements, which is corresponding to positions where the color correction should be performed, to emit light based on results of the detection by the detector.

In a fourth aspect of the present invention, there is provided an image forming apparatus that includes an image reading device adapted to read an original as an image, and forms the image of the original on a recording sheet, wherein the image reading device comprises an illuminator adapted to illuminate an original, the illuminator including a plurality of white light-emitting elements, and a plurality of colored light-emitting elements adapted to emit lights of different colors and arranged in a manner associated with each of the respective white light-emitting elements, a controller adapted to cause the colored light-emitting elements to be lighted, so as to correct a color of light emitted from each of the white light-emitting elements, and a reader adapted to read the original illuminated by the illuminator as an image.

The controller can be adapted to cause ones of the colored light-emitting elements to emit lights, the ones of the colored light-emitting elements emitting lights having respective color components which the color of light emitted from each of the white light-emitting elements lacks.

In a fifth aspect of the present invention, there is provided an image forming apparatus that includes an image reading device adapted to read an original as an image, and forms the image of the original on a recording sheet, wherein the image reading device comprises an illuminator adapted to illuminate an original, a reader adapted to read the original illuminated by the illuminator as an image, light emitting elements adapted to emit colored lights for use in color correction of illumination by the illuminator, and a controller adapted to cause the reader to read a white reference member illuminated by the illuminator and control light emission of the light emitting elements according to results of the reading.

In a sixth aspect of the present invention, there is provided an image forming apparatus that includes an image reading device adapted to read an original as an image, and forms the image of the original on a recording sheet, wherein the original illuminating device comprises an illuminator adapted to illuminate an original, a detector adapted to detect a color of illumination by the illuminator at a plurality of positions, a plurality of light emitting elements adapted to emit colored lights for use in color correction of illumination by the illuminator, and a controller adapted to cause ones of the plurality of light emitting elements to emit light based on results of the detection by the detector, the ones corresponding to positions where the color correction should be performed.

The illuminator emits linear light.

The above and other objects, features, and advantages of the invention will become more apparent from the following detailed description taken in conjunction with the accompanying drawings.

BRIEF DESCRIPTION OF THE DRAWINGS

FIGS. 10A1, 10A2, 10B1 and 10B2 are graphs showing spectral characteristics of lights emitted from the lamp unit before and after the correction operations in FIGS. 9A and 9B, respectively.

DETAILED DESCRIPTION OF THE PREFERRED EMBODIMENTS

The present invention will now be described in detail below with reference to the accompanying drawings showing preferred embodiment thereof.

Figure 1:
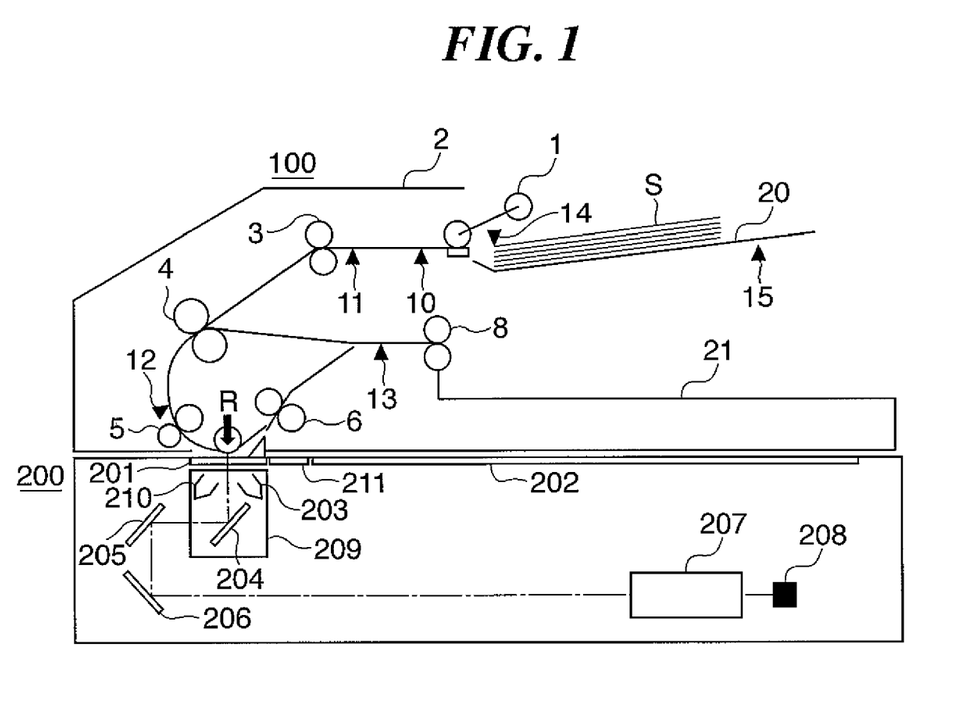
FIG. 1 is a schematic diagram of an image reading apparatus having an ADF mounted thereon, according to an embodiment of the present invention.

FIG. 1 is a schematic diagram of an image reading apparatus having an ADF (automatic document feeder) mounted thereon, according to an embodiment of the present invention.

Referring to FIG. 1, the ADF 100, which is an original conveying device, is mounted on the image reading apparatus 200. Hereinafter, a description will be given of the arrangement thereof together with its operation.

As shown in FIG. 1, the ADF 100 sequentially feeds originals to a separating section 2 by a pickup roller 1 one by one from an uppermost original of an original bundle S set on an original tray 20 with their front surfaces facing upward. The separating section 2 has a separation roller and a separation pad disposed below the separation roller, and is configured such that originals are separated one by one from the uppermost original of the original bundle S.

When images on the front surface of single-sided originals are to be read, the skew of each separated original is corrected during separation and conveyance of the original by a registration roller pair 3, whereafter the separated original is conveyed by a second registration roller pair 4 and a first conveying roller pair 5.

Then, the image on the front surface of the original is read while the original is being conveyed on a reading position R. After that, the original is conveyed by a second conveying roller pair 6, and is discharged onto a discharge tray 21 with the front surface thereof facing downward.

Further, when images on the front and back surfaces of double-sided originals are to be read, the skew of each separated original is corrected during separation and conveyance of the original by the registration roller pair 3, whereafter the separated original is conveyed by the second registration roller pair 4, the first conveying roller pair 5, and second conveying roller pair 6.

Then, the image on the front surface of the original is read while it is being conveyed on the reading position R. After that, the original is conveyed by the second conveying roller pair 6, and is once conveyed by a discharge roller pair 8 until its leading end is discharged onto the discharge tray 21. Then, the conveyance of the original is stopped with the trailing end of the original nipped by the discharge roller pair 8.

Subsequently, the original is conveyed in a switchback manner, and after having the skew corrected again by the second registration roller pair 4, it is conveyed by the first conveying roller pair 5, and the second conveying roller pair 6, so as to have the image on the back surface thereof read while being conveyed on the reading position R again.

However, if each original is discharged onto the discharge tray 21 as it is, with the front surface thereof facing upward, by the second conveying roller pair 6 and the discharge roller pair 8, the order of respective surfaces of the discharged originals become different from the that of the originals set on the original tray 20. Therefore, the original having the image on the back surface thereof read is conveyed again by the second conveying roller pair 6 and the discharge roller pair 8 until the leading end thereof is discharged onto the discharge tray 21, and then the conveyance of the originals is stopped with the trailing end thereof nipped by the discharge roller pair 8.

Then, the original is switchbacked, and is conveyed by the second registration roller pair 4, the first conveying roller pair 5, and the second conveying roller pair 6, followed by being discharged onto the discharge tray 21 by the discharge roller pair 8 with the front surface thereof facing downward. However, even during conveyance of the original on the reading position R, reading of the image thereon image is not performed this time.

Sensors 10 to 15 schematically indicated by black triangles in FIG. 1 will be described hereinafter.

The image reading apparatus 200 optically reads an image on an original for photoelectric conversion, and outputs the read image as image data.

The image reading apparatus 200 is comprised of a platen glass (ADF platen) 201 for ADF originals, a platen glass (book platen) 202 for book-type originals, and a scanning unit 209 having lamp units 203 and 210, and a mirror 204. Further, the image reading apparatus 200 is provided with mirrors 205 and 206, a lens 207, a CCD sensor 208, and a reference white plate 211.

In reading an image on an original conveyed from the ADF 100, the image reading apparatus 200 moves the scanning unit 209 to a position under the ADF platen 201, causes the same to stand still there, and reads the image i.e. image information on the original as the original is conveyed on the reading position.

Further, in reading an image on an original placed on the book platen 202, the image reading apparatus 200 moves the scanning unit 209 from an original-setting reference position, not shown, in the sub scanning direction, for reading image information on the original (pressure plate mode scanning).

In reading the image information on the original, lamps of the lamp units 203 and 210 are lighted to illuminate the original. Reflected light from the original is input to the CCD sensor 208 via the mirrors 204, 205, and 206, and the lens 207. The reflected light input to the CCD sensor 208 is subjected to electrical processing, such as photoelectric conversion, and conventional digital processing, in the CCD sensor 208.

It should be noted that the present invention can also be applied to an image reading apparatus in which the image reading apparatus 200 and the original conveying device 100 are integrally united with each other.

Figure 2:
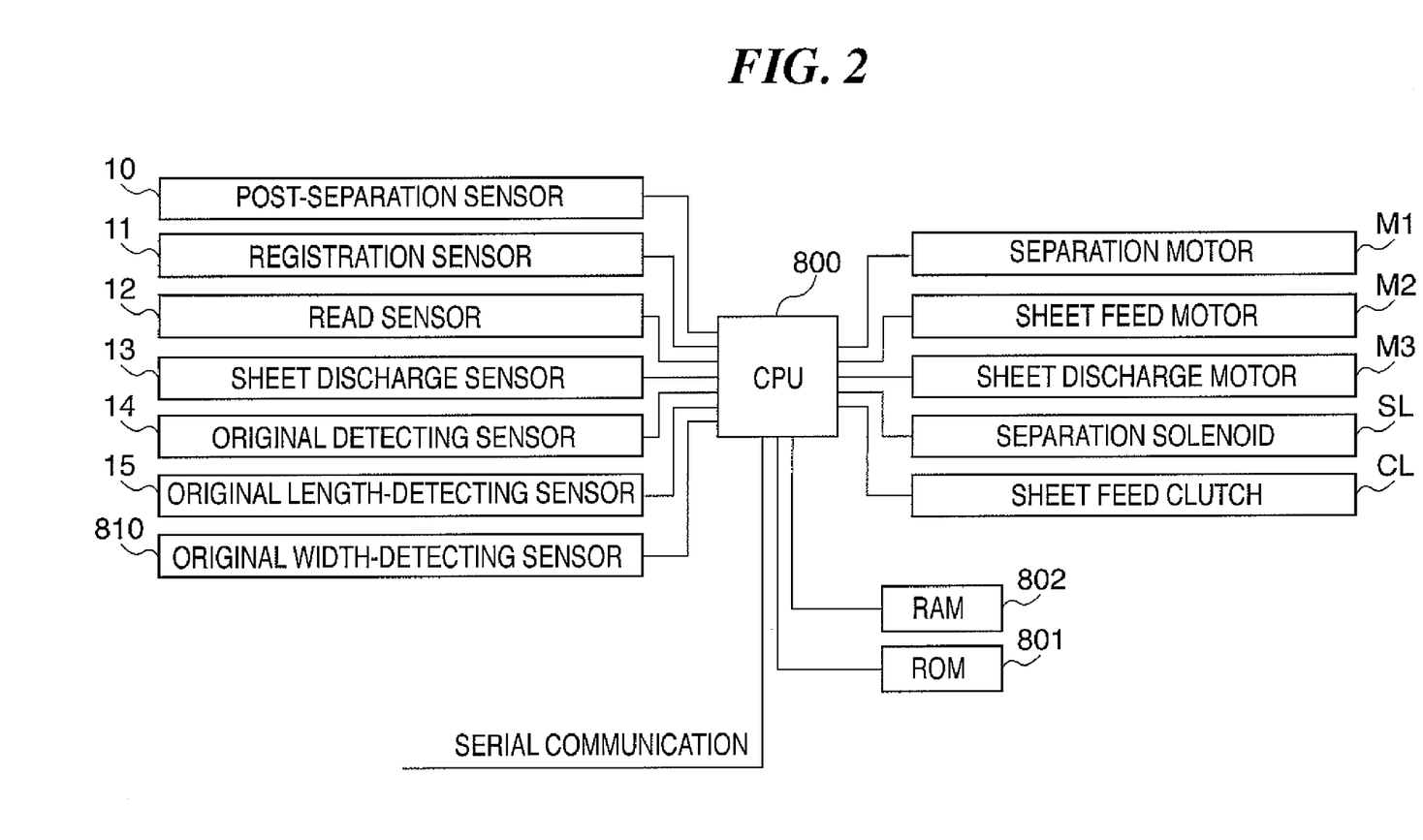
FIG. 2 is a functional block diagram of the ADF appearing in FIG. 1.

FIG. 2 is a functional block diagram of the ADF appearing in FIG. 1.

As shown in FIG. 2, the ADF 100 is comprised of a control unit 800 (hereinafter referred to as "the CPU") as a central processing unit, a read only memory (hereinafter referred to as "ROM") 801, a random access memory (hereinafter referred to as "RAM") 802, output ports, and input ports. The ROM 801 stores control programs, and the RAM 802 stores input data and operation data. Further, to the output ports of the CPU 800 are connected a separation motor M1, a sheet feed motor M2, a sheet discharge motor M3, a separation solenoid SL, and a sheet feed clutch CL. To the input ports of the CPU 800 are connected a post-separation sensor 10, a registration sensor 11, a read sensor 12, a sheet discharge sensor 13, an original detecting sensor 14, an original length-detecting sensor 15, and an original width-detecting sensor 810, not shown in FIG. 1, respectively.

The CPU 800 controls the separation motor M1, the sheet feed motor M2, the sheet discharge motor M3, the separation solenoid SL, and the sheet feed clutch CL, according to the control programs stored in the ROM 801. The CPU 800 performs serial communication with a central processing unit (CPU) of the image reading apparatus 200 so as to transmit and receive control data to and from the image reading apparatus 200.

It should be noted that when the present invention is also applied to the image reading apparatus in which the image reading apparatus 200 and the original conveying device 100 are integrally united with each other, the CPUs of the two apparatuses may be replaced by a single CPU without performing the communication therebetween.

Figure 3:
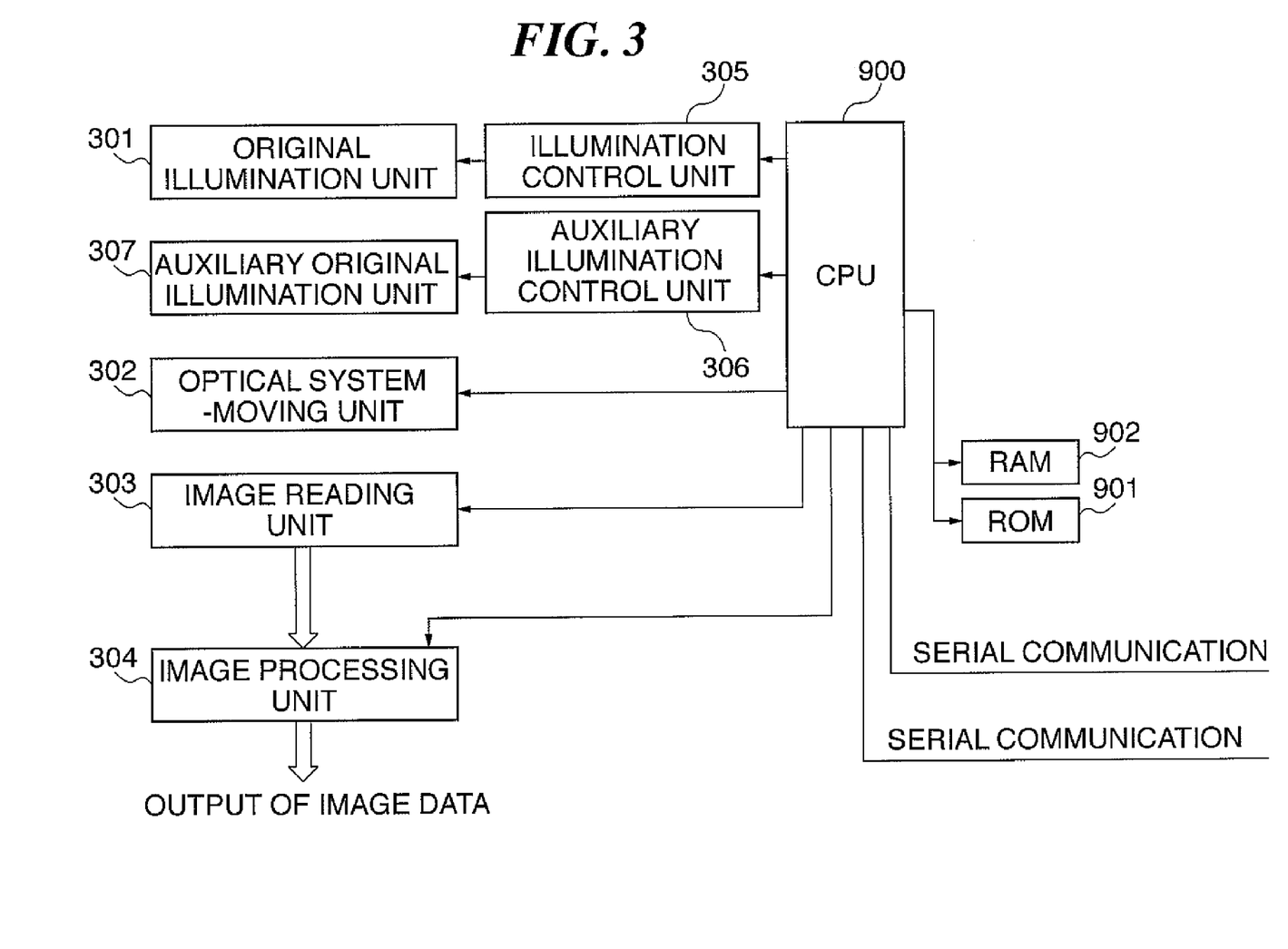
FIG. 3 is a functional block diagram of the image reading apparatus shown in FIG. 1.

FIG. 3 is a functional block diagram of the image reading apparatus appearing in FIG. 1.

As shown in FIG. 3, the image reading apparatus 200 includes original illumination units 301, which are main illumination units included in the lamp units 203 and 210, auxiliary original illumination units 307 which are sub-illumination units for tint correction (color correction) and are included in the lamp units 203 and 210.

Further, the image reading apparatus 200 is provided with an optical system-moving unit 302 for moving the scanning unit 209, and an image reading unit 303 formed by the CCD sensor 208.

Further, the image reading apparatus 200 includes an image processing unit 304 for correction and A/D conversion of analog signals from the image reading unit 303, and an illumination control unit 305 for controlling lighting of the original illumination units 301.

Further, the image reading apparatus 200 includes an auxiliary illumination control unit 306 for controlling lighting of the auxiliary original illumination units 307, a CPU 900, a ROM 901, and a RAM 902, and optimally controls the aforementioned units 302 to 306, the ROM 901, and the RAM 902, by the CPU 900.

Further, the original illumination units 301 and the auxiliary original illumination units 307 may be configured such that they are directly controlled by the CPU 900, not by the illumination control unit 305 and the auxiliary illumination control unit 306.

Figure 4:
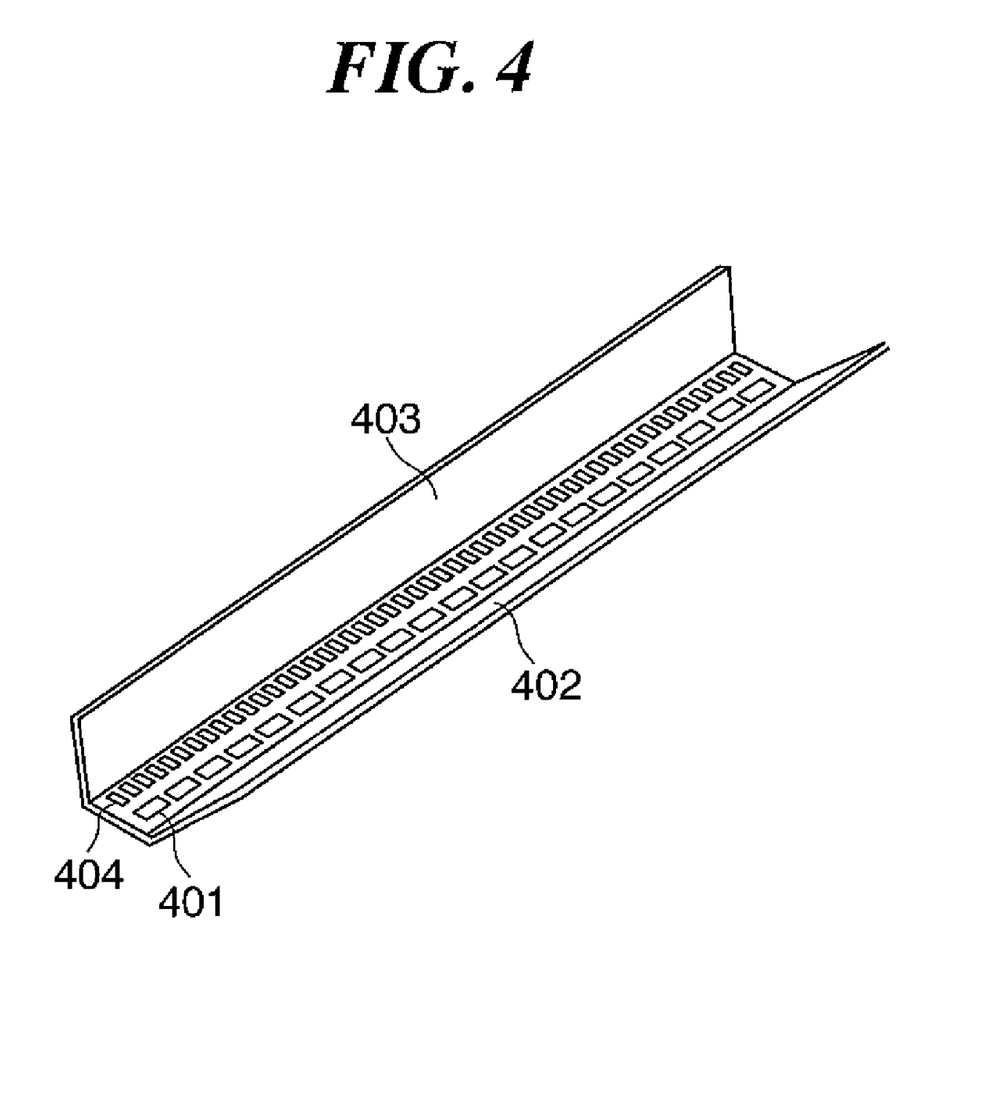
FIG. 4 is a view of the appearance of one of lamp units appearing in FIG. 1.

FIG. 4 is a view of the appearance of one of the lamp units (203 and 210) appearing in FIG. 1.

As shown in FIG. 4, white LEDs 401 (main LEDs; the original illumination units 301 in FIG. 3) are arranged in a line at equal intervals. Light from the white LEDs 401 is reflected and diffused by reflection plates 402 and 403, for illuminating the surface of an original. Auxiliary LEDs 404 (the auxiliary original illumination units 307 in FIG. 3) are provided for tint correction (color correction), and are used as auxiliary light sources for the white LEDs 401. The auxiliary LEDs 404 are formed by LEDs of a plurality of colors, which are sequentially arranged in a line.

Although in the embodiment shown in FIG. 4, the white LEDs 401 and the auxiliary LEDs 404 are formed by LED chips, discrete type LEDs may be used.

Figure 5:
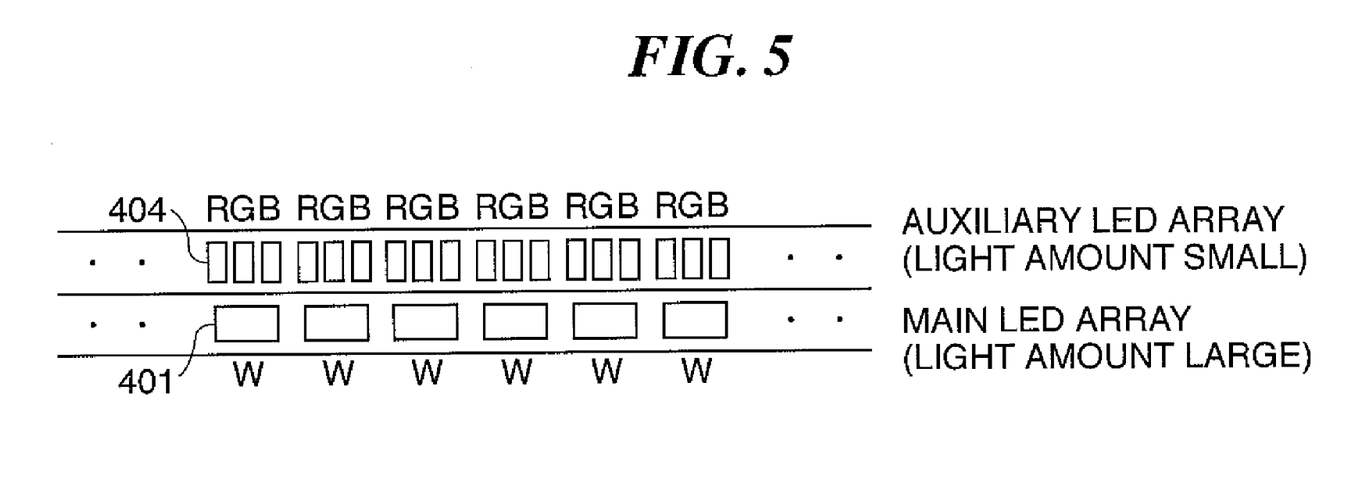
FIG. 5 is a diagram showing a first example of correspondence between main LEDs and auxiliary LEDs in the lamp unit in FIG. 4.

Further, to configure an image reading apparatus as one capable of reading color originals, it is desirable to use the white LEDs 401, and at the same time form the auxiliary LEDs 404 by sequentially arranging LEDs of a plurality of colors including e.g. R, G, and B (red, green, and blue). FIG. 5 shows details of the above-described arrangement of the white LEDs 401 and the auxiliary LEDs 404. As shown in FIG. 5, LEDs 404 of the respective colors (R, G, and B) are arranged at respective positions corresponding to a position of one white LED 401.

Figure 6:
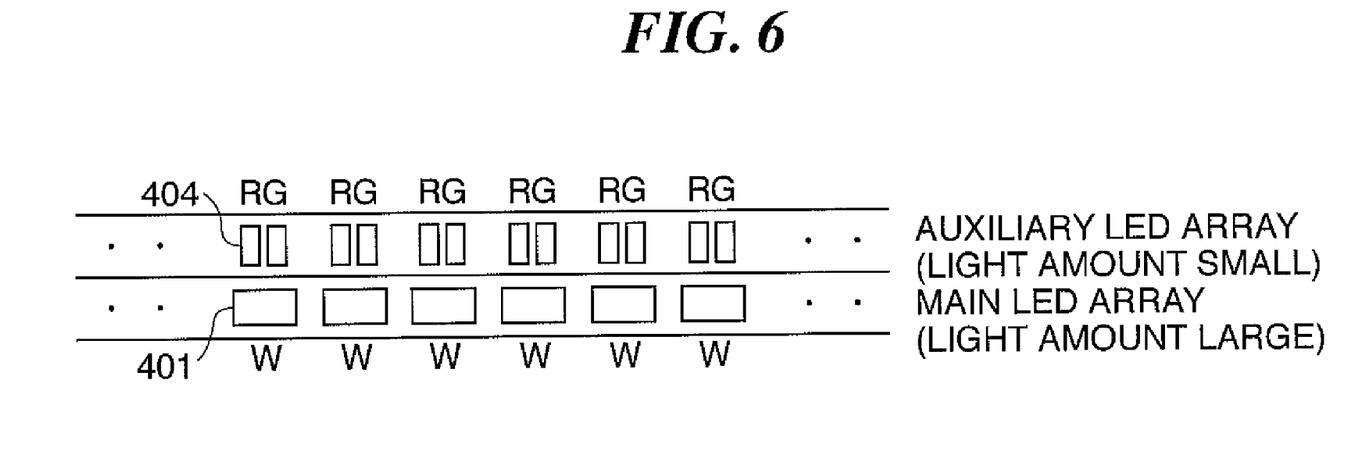
FIG. 6 is a diagram showing a second example of the correspondence between the main LEDs and the auxiliary LEDs in the lamp unit in FIG. 4.

Furthermore, when the characteristic of the chromaticity variation of the white LED 401 as a main light source is limited to a color component of blue, to compensate for shortage of yellow as the complementary color of blue, LEDs of red (R) and green (G) may be arranged alternately as the auxiliary LEDs 404. FIG. 6 shows details of the above-described arrangement of the white LEDs 401 and the auxiliary LEDs 404. As shown in FIG. 6, LEDs of red (R) and green (G) are arranged at respective positions corresponding to the position of each white LED 401.

The auxiliary LEDs (auxiliary LED array) 404 may be formed by LEDs which are smaller in light intensity and are more inexpensive than the white LEDs 401 as a main LED array.

Figure 7:
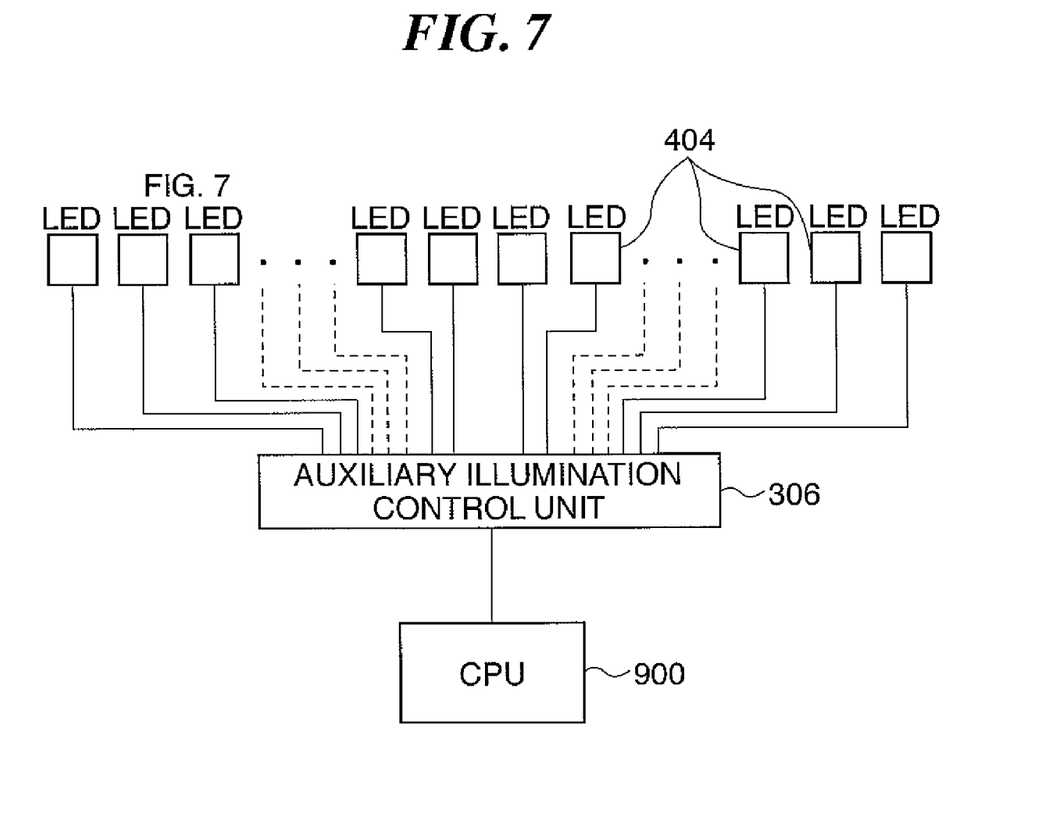
FIG. 7 is a control block diagram of the auxiliary LEDs shown in FIGS. 4 to 6.

FIG. 7 is a control block diagram of the auxiliary LEDs shown in FIGS. 4 to 6.

As shown in FIG. 7, it is possible to control lighting of the individual auxiliary LEDs 404 by the auxiliary illumination control unit 306.

Figure 8:
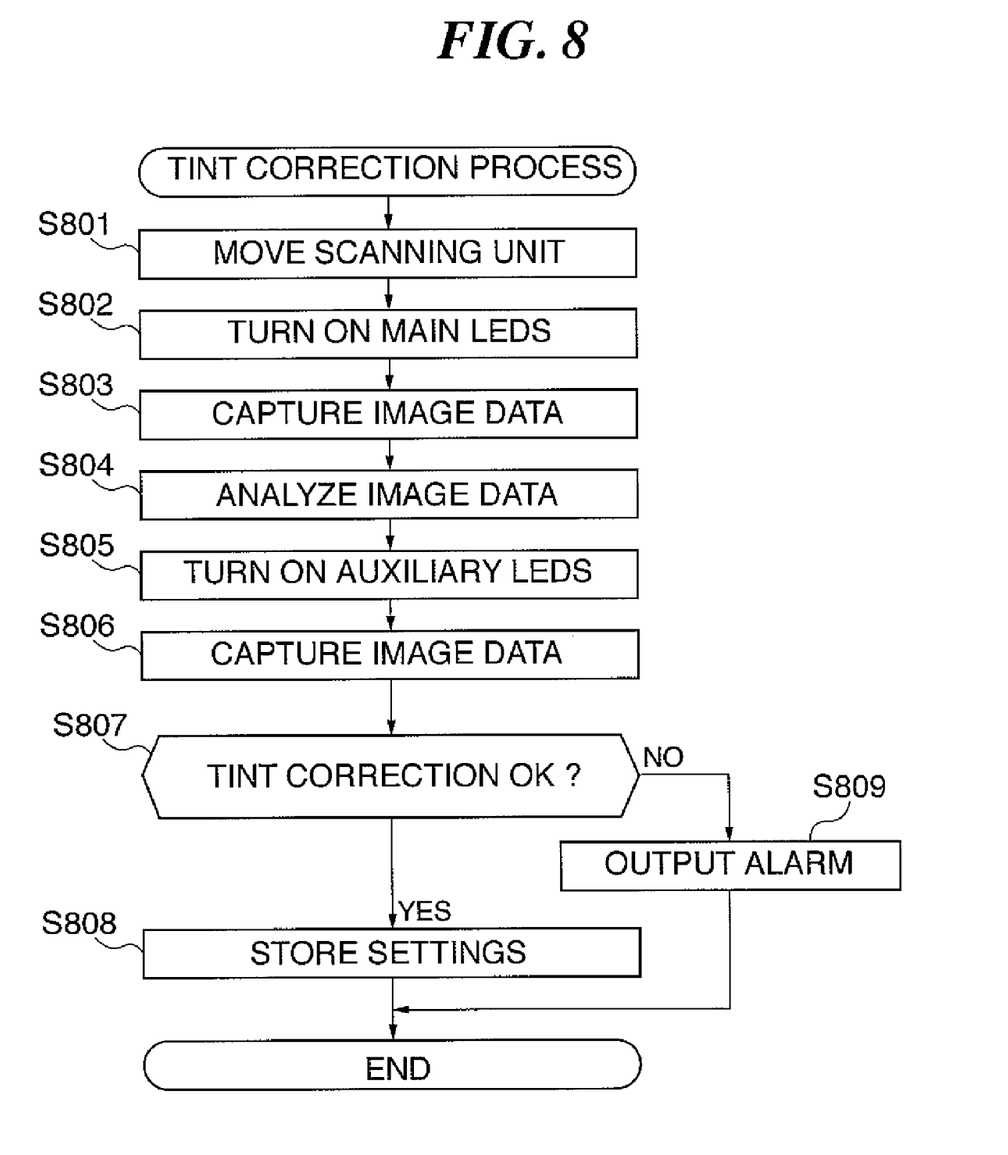
FIG. 8 is a flowchart of a tint correction process for illumination units, executed by the functional blocks of the image reading apparatus shown in FIG. 3.

FIG. 8 is a flowchart showing a tint correction process for the illumination units, executed by the FIG. 3 functional blocks of the image reading apparatus.

The tint correction process is executed under the control of the CPU 900 appearing in FIG. 3.

Referring to FIG. 8, first, the CPU 900 causes the scanning unit 209 to be moved to a position under the reference white plate 211 by a scanning unit-moving motor (the optical system-moving unit 302 shown in FIG. 3) in a step S801, and lights the white LEDs (main LEDs) 401 (the original illumination units 301) in a step S802.

The CPU 900 causes the CCD sensor 208 (the image reading unit 303 shown in FIG. 3) to read reflected light from the reference white plate 211 illuminated by the white LEDs 401, and output obtained image data to the image processing unit 304 (step S803).

Then, the CPU 900 causes the image processing unit 304 to analyze chromaticities on a line of the image data in a main scanning direction, identify a position, if any, different in chromaticity from positions therearound, and calculate a color component which light at the position lacks (step S804).

Then, the CPU 900 lights one or ones of auxiliary LEDs 404 corresponding to each position identified in the step S804, the one or ones providing a color corresponding to the color component which the light at the position lacks, (step S805). Then, the CPU 900 causes the CCD sensor 208 (the image reading unit 303) to capture image data again in a state in which the white LED 401 and the auxiliary LED(s) 404 at each identified position remain lighted (step S806), and determines whether or not the tint variation in the main scanning direction is corrected, by the same process as carried out in the step 804 (step S807).

When the tint variation is corrected to an acceptable level, the CPU 900 stores the position(s) where light of the auxiliary LED(s) 404 was performed, and the color(s) of the lighted auxiliary LED(s) 404 (step S808), followed by terminating the present process. If it is determined in the step S807 that the tint variation is not acceptably improved, there is also a possibility that the auxiliary LEDs 404 or a lighting circuit is faulty, and hence the CPU 900 generates an alarm output (step S809), followed by terminating the present process.

Although in the present embodiment, the tint correction operation is carried out by the CPU 900 within the image reading apparatus, by way of example, this is not limitative, but a tint adjustment operation may be performed by an external device such that the result of the operation is stored in the ROM 901 within the image reading apparatus.

Figure 9A:
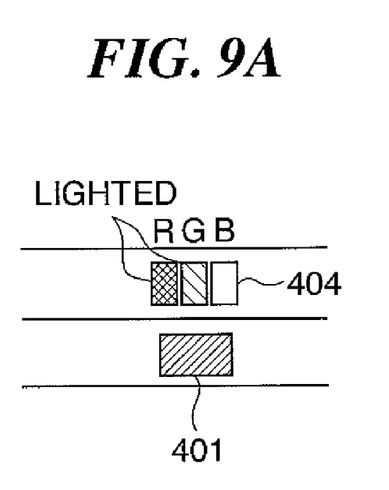
FIGS. 9A and 9B are diagrams showing examples of methods of lighting auxiliary LEDs in a manner responsive to a tint of light emitted from a white LED, which is executed in the tint correction process in FIG. 8.
Figure 9B:
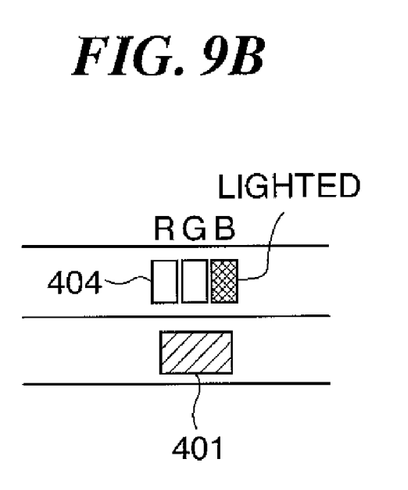

FIGS. 9A and 9B are diagrams showing examples of methods of lighting auxiliary LEDs in a manner responsive to a tint of light emitted from a white LED, which is executed in the tint correction process in FIG. 8.

FIG. 9A is a diagram useful in explaining a case in which light emitted from a white LED 401 lacks color components of red (R) and green (G). As shown in FIG. 9A, when the color of light emitted from the white LED 401 is bluish-white (blue-rich white), color components which the light emitted from the white LED 401 lacks to make the color of the emitted light white are red and green. Therefore, out of auxiliary LEDs 404 adjacent to the corresponding white LED 401, auxiliary LEDs 404 which emit red (R) and green (G) lights, respectively, are lighted.

Similarly, FIG. 9B is a diagram useful in explaining a case in which light emitted from a white LED 401 lacks a color component of blue (B). As shown in FIG. 9B, when the color of light emitted from the white LED 401 is yellowish-white (yellow-rich white), a color component which the light emitted from the white LED 401 lacks to make the color of the emitted light white is blue. Therefore, out of auxiliary LEDs 404 adjacent to the corresponding white LED 401, an auxiliary LED 404 which emits a blue (B) light is lighted.

FIGS. 10A1, 10A2, 10B1 and 10B2 are graphs showing spectral characteristics of lights emitted from the lamp unit before and after the correction operations in FIGS. 9A and 9B, respectively.

Figure 10A:
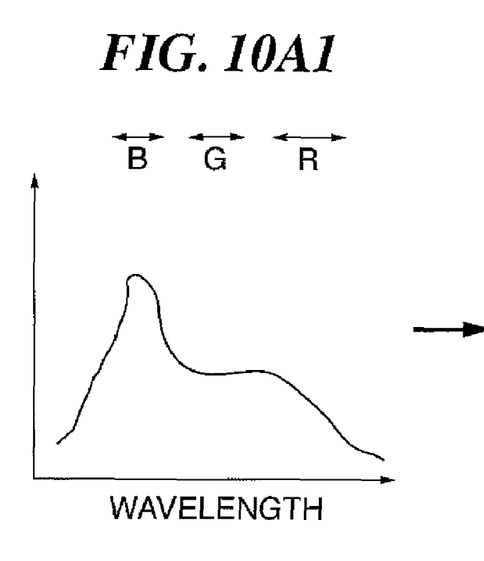
Figure 10A:
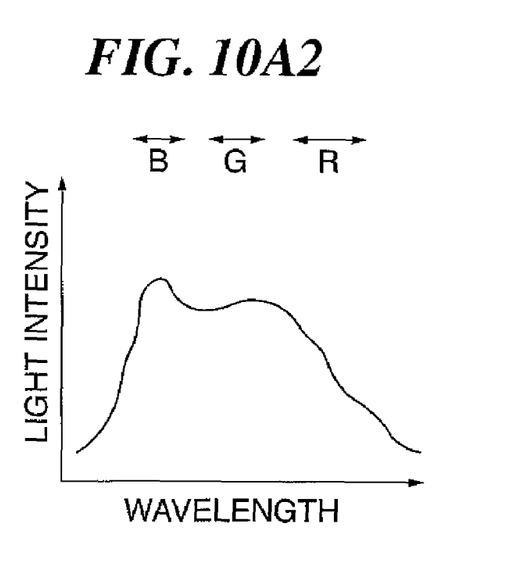

When the light emitted from the white LED 401 lacks the color components of red (R) and green (G), as described hereinabove with reference to FIG. 9A, the spectral characteristic of the light emitted from the white LED 401 is represented by a graph in FIG. 10A1. The spectral characteristic of the corrected light is represented by a graph in FIG. 10A2, which shows that the spectral characteristic of the light is improved such that the color of the light becomes closer to white.

Figure 10B:
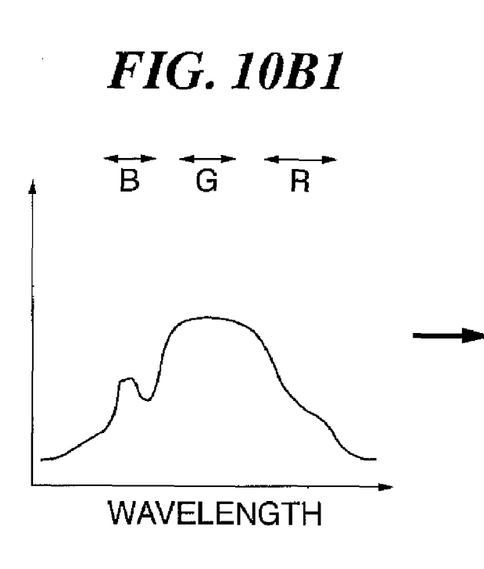
Figure 10B:
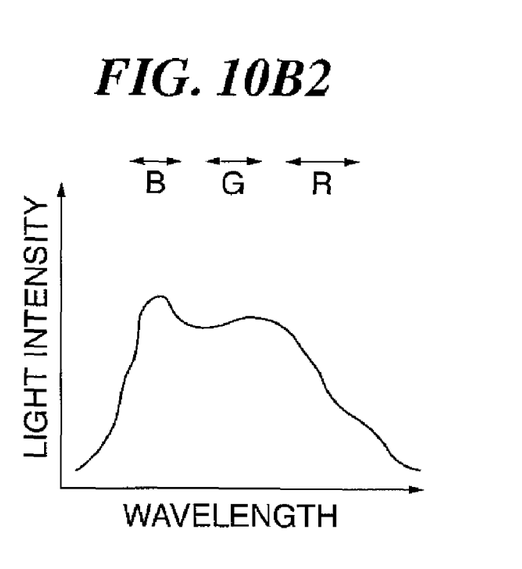

When the light emitted from the white LED 401 lacks the color component of blue (B), as described hereinabove with reference to FIG. 9B, the spectral characteristic of light emitted from the white LED 401 is represented by a graph in FIG. 10B1. The spectral characteristic of the corrected light is represented by a graph in FIG. 10B2, which shows that the spectral characteristic of the light is improved such that the color of the light becomes closer to white.

After performing the above-described correction operations, and storing the settings for lighting the auxiliary LEDs 404, the white LEDs 401 and the auxiliary LEDs 404 the settings of which are stored are lighted during actual original reading. This makes it possible to achieve illumination which has little tint variation and is suitable for reading color originals.

Further, since inexpensive LEDs are employed as the auxiliary LEDs 404, it is possible to minimize an increase in the manufacturing cost of the illuminating device.

In another embodiment, the image reading apparatus may be configured such that not only lighting of the individual auxiliary LEDs 404 but also the amount of light emitted therefrom can be controlled. In this case, it is possible to produce a finer illumination distribution. Furthermore, although in the present embodiment, the illuminating device using LEDs is configured such that it is applied to a linear light source, this is not limitative, but it can also be applied to a surface light source, for example.

Further, in another embodiment, the image reading apparatus may be configured such that the auxiliary LEDs 404 are arranged in the vicinity of light sources, such as a halogen lamp, a xenon lamp, a cold-cathode tube, and a fluorescent lamp, which are used in place of the white LEDs, and the tints of the light sources are corrected based on a position-by-position basis in the main scanning direction.

The image reading apparatus according to the present embodiment is equipped with an illuminating device comprising a light source formed by arranging a plurality of white LEDs, and an auxiliary light source formed by sequentially arranging LEDs of a plurality of colors, for tint correction, and disposed at a location adjacent to the light source. When the light source formed by the white LEDs is lighted, a tint (chromaticity) variation is measured, and for any position suffering from a tint difference, an LED or LEDs of the auxiliary light source adjacent to the position and corresponding to a color component which the light emitted from the portion of the light source lacks is lighted. This makes it possible to realize an illuminating device having little tint variation, thereby making it possible to obtain an excellent read image.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-211191 filed Aug. 2, 2006, which is hereby incorporated by reference herein in its entirety.

What is claimed is:

1. An image reading apparatus comprising:
   an illuminator adapted to illuminate an original, said illuminator including a plurality of white light emitting elements, and a plurality of colored light emitting elements adapted to emit lights of different colors and arranged in a manner associated with each of said respective white light emitting elements;

a controller adapted to cause said colored light emitting elements to emit lights, so as to correct a color of light emitted from each of said white light emitting elements; and a reader adapted to read the original illuminated by said illuminator, wherein a particular one of said white light emitting elements is a white LED, wherein said controller is adapted to cause one or more of said colored light emitting elements that are more adjacent to said white LED than the others of said colored light emitting elements to emit light having a red component and a green component in response to said white LED emitting bluish white light, wherein said controller is adapted to cause one or more of said colored light emitting elements that are more adjacent to said white LED than the others of said colored light emitting elements to emit light having a blue component in response to said white LED emitting yellowish white light, wherein said plurality of white light emitting elements are arranged linearly in an array, wherein said plurality of colored light emitting elements are arranged linearly in an array parallel to and adjacent the linear array of white light emitting elements in a manner that each of a plurality of groups of colored light emitting elements is aligned with one white light emitting element, and wherein each of the groups of colored light emitting elements includes a sequence of different-colored light emitting elements.

2. An image reading apparatus according to claim 1, wherein said controller is adapted to cause said colored light emitting elements to emit lights having respective color components which the color of light emitted from each of said white light emitting elements lacks.

3. An image reading apparatus according to claim 1, wherein a maximum light intensity output by each of said plurality of colored light emitting elements when emitting light is smaller than a maximum light intensity output by each of said plurality of white light emitting elements when emitting light.

4. An image reading apparatus according to claim 1, wherein one of said plurality of colored light emitting elements includes a red light emitting element, a green light emitting element, and a blue light emitting element, wherein said red, green and blue light emitting elements are provided at a position corresponding to a position where one of said plurality of white light emitting elements is provided.

5. An image reading apparatus according to claim 1, wherein one of said plurality of colored light emitting elements includes a red light emitting element and a green light emitting element, wherein said red and green light emitting elements are provided at a position corresponding to a position where one of said plurality of white light emitting elements is provided.

6. An image forming apparatus that includes an image reading device adapted to read an original as an image, and forms the image of the original on a recording sheet, wherein said image reading device comprises:

an illuminator adapted to illuminate an original, said illuminator including a plurality of white light emitting elements, and a plurality of colored light emitting elements adapted to emit lights of different colors and arranged in a manner associated with each of said respective white light emitting elements;

a controller adapted to cause said colored light emitting elements to be lighted, so as to correct a color of light emitted from each of said white light emitting elements; and a reader adapted to read the original illuminated by said illuminator, wherein a particular one of said white light emitting elements is a white LED, wherein said controller is adapted to cause one or more of said colored light emitting elements that are more adjacent to said white LED than the others of said colored light emitting elements to emit light having a red component and a green component in response to said white LED emitting bluish white light, wherein said controller is adapted to cause one or more of said colored light emitting elements that are more adjacent to said white LED than the others of said colored light emitting elements to emit light having a blue component in response to said white LED emitting yellowish white light, wherein said plurality of white light emitting elements are arranged linearly in an array, wherein said plurality of colored light emitting elements are arranged linearly in an array parallel to and adjacent the linear array of white light emitting elements in a manner that each of a plurality of groups of colored light emitting elements is aligned with one white light emitting element, and wherein each of the groups of colored light emitting elements includes a sequence of different-colored light emitting elements.

7. An image forming apparatus according to claim 6, wherein said controller is adapted to cause at least some of said colored light emitting elements to emit lights having respective color components which the color of light emitted from each of said white light emitting elements lacks.

8. An image reading apparatus comprising:

an illuminator adapted to illuminate an original, said illuminator including a plurality of white light emitting elements, and a plurality of colored light emitting elements adapted to emit lights of different colors and arranged in a manner associated with each of said respective white light emitting elements;

a controller adapted to cause said colored light emitting elements to emit lights, so as to correct a color of light emitted from each of said white light emitting elements; and a reader adapted to read the original illuminated by said illuminator, wherein a particular one of said white light emitting elements is a white LED, wherein said controller is adapted to cause one or more of said colored light emitting elements that are more adjacent to said white LED than the others of said colored light emitting elements to emit light having a red component and a green component in response to said white LED emitting bluish white light, wherein said plurality of white light emitting elements are arranged linearly in an array, wherein said plurality of colored light emitting elements are arranged linearly in an array parallel to and adjacent the linear array of white light emitting elements in a manner that each of a plurality of groups of colored light emitting elements is aligned with one white light emitting element, and wherein each of the groups of colored light emitting elements includes a sequence of different-colored light emitting elements.

9. An image reading apparatus comprising:

an illuminator adapted to illuminate an original, said illuminator including a plurality of white light emitting elements, and a plurality of colored light emitting elements adapted to emit lights of different colors and arranged in a manner associated with each of said respective white light emitting elements;

a controller adapted to cause said colored light emitting elements to emit lights, so as to correct a color of light emitted from each of said white light emitting elements; and a reader adapted to read the original illuminated by said illuminator, wherein a particular one of said white light emitting elements is a white LED, wherein said controller is adapted to cause one or more of said colored light emitting elements that are more adjacent to said white LED than the others of said colored light emitting elements to emit light having a blue component in response to said white LED emitting yellowish white light, wherein said plurality of white light emitting elements are arranged linearly in an array, wherein said plurality of colored light emitting elements are arranged linearly in an array parallel to and adjacent the linear array of white light emitting elements in a manner that each of a plurality of groups of colored light emitting elements is aligned with one white light emitting element, and wherein each of the groups of colored light emitting elements includes a sequence of different-colored light emitting elements.

10. An image reading apparatus comprising:

an illuminator adapted to illuminate an original, said illuminator including a plurality of white light emitting elements, and a plurality of colored light emitting elements adapted to emit lights of different colors and arranged in a manner associated with each of said respective white light emitting elements;

a controller adapted to cause said colored light emitting elements to emit lights, so as to correct a color of light emitted from each of said white light emitting elements; and a reader adapted to read the original illuminated by said illuminator, wherein a particular one of said white light emitting elements is a white LED, wherein said controller is adapted to cause one or more of said colored light emitting elements that are more adjacent to said white LED than the others of said colored light emitting elements to emit light having a color component complementing a color component of colored white light emitted from said white LED, wherein said plurality of white light emitting elements are arranged linearly in an array, wherein said plurality of colored light emitting elements are arranged linearly in an array parallel to and adjacent the linear array of white light emitting elements in a manner that each of a plurality of groups of colored light emitting elements is aligned with one white light emitting element, and wherein each of the groups of colored light emitting elements includes a sequence of different-colored light emitting elements.

* * * * *